United States Patent
Liller et al.

(10) Patent No.: US 7,082,930 B2
(45) Date of Patent: Aug. 1, 2006

(54) METHOD FOR CONTROLLING ENGINE FUEL INJECTION IN A HYBRID ELECTRIC VEHICLE

(75) Inventors: David Liller, Westland, MI (US);
Kenneth Miller, Canton, MI (US);
Paul Niessen, Plymouth, MI (US);
Chris Kapolnek, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 154 days.

(21) Appl. No.: 10/710,757

(22) Filed: Jul. 30, 2004

(65) Prior Publication Data

US 2006/0021602 A1 Feb. 2, 2006

(51) Int. Cl.
*F02D 41/06* (2006.01)

(52) U.S. Cl. .................. 123/491; 123/179.16; 701/104
(58) Field of Classification Search ................ 124/491, 124/673, 179.16; 701/104
See application file for complete search history.

(56) References Cited

U.S. PATENT DOCUMENTS

| | | | |
|---|---|---|---|
| 3,483,851 A | 12/1969 | Reichardt | |
| 4,469,072 A | 9/1984 | Kobayashi et al. | |
| 5,009,211 A | 4/1991 | Kushida et al. | |
| 5,092,301 A | 3/1992 | Ostdiek | |
| 5,394,857 A | 3/1995 | Yamakawa | |
| 5,492,101 A | 2/1996 | Saito et al. | |
| 5,818,116 A | 10/1998 | Nakae et al. | |
| 5,826,671 A | 10/1998 | Nakae et al. | |
| 5,893,349 A | 4/1999 | Rado | |
| 6,006,727 A | 12/1999 | Katashiba et al. | |
| 6,212,879 B1 | 4/2001 | Nishimura et al. | |
| 6,257,207 B1 * | 7/2001 | Inui et al. | 123/491 |
| 6,274,943 B1 | 8/2001 | Hasegawa et al. | |
| 6,307,277 B1 | 10/2001 | Tamai et al. | |
| 6,380,640 B1 | 4/2002 | Kanamori et al. | |
| 6,481,405 B1 | 11/2002 | Fujino et al. | |
| 6,584,962 B1 * | 7/2003 | Nonomura et al. | 123/491 |
| 6,598,589 B1 | 7/2003 | Frelund et al. | |
| 6,769,400 B1 * | 8/2004 | Ament | 123/399 |
| 6,796,293 B1 * | 9/2004 | Bayerle et al. | 123/491 |
| 6,918,367 B1 * | 7/2005 | Denz et al. | 123/179.17 |
| 2002/0157651 A1 | 10/2002 | Hasegawa et al. | |
| 2003/0075152 A1 | 4/2003 | Joos et al. | |
| 2003/0173123 A1 | 9/2003 | Nakanowatari | |

FOREIGN PATENT DOCUMENTS

| | | |
|---|---|---|
| JP | 2003003888 | 1/2003 |
| JP | 2003106194 | 4/2003 |

\* cited by examiner

*Primary Examiner*—Erick R Solis
(74) *Attorney, Agent, or Firm*—David B. Kelley; Brooks & Kushman

(57) ABSTRACT

A method for controlling fuel injection during engine startup in a hybrid electric vehicle. The hybrid electric vehicle includes an engine, a power source, an electrical machine, and a control module. The method includes the steps of driving the engine with the electrical machine, determining whether the engine is at a target state, selecting a cylinder for fuel injection, calculating an amount of fuel to provide to the cylinder, injecting the amount of fuel, and repeating the selecting, calculating, and injecting steps for another cylinder for a predetermined number of iterations.

20 Claims, 5 Drawing Sheets

METHOD FOR CONTROLLING ENGINE FUEL INJECTION IN A HYBRID ELECTRIC VEHICLE

BACKGROUND OF INVENTION

1. Field of the Invention

The present invention relates generally to the operation of hybrid vehicles, and more particularly to the operation of an engine of a hybrid electric vehicle.

2. Background Art

Methods for controlling the operation of an internal combustion engine in a hybrid vehicle are known in the hybrid vehicle engine control art, such as that described in U.S. Pat. No. 5,818,116. This patent focus on driving an internal combustion engine at a predetermined revolving speed to prevent variation in torque output at the time the internal combustion engine is started. However, it does not detail the specific steps for implementing fuel injection control and ignition timing control of the engine, nor does it address the vehicle emissions concerns associated with "overfueling" during engine startups.

Before applicants invention, there was a need for a method for controlling fuel injection during engine startups that more rapidly determines and provides a precise amount of fuel to provide to a particular engine cylinder to lower vehicle emissions. Moreover, there was a desire to inhibit "overfueling" conditions yet provide sufficient fuel to facilitate robust engine starts. Problems associated with the prior art as noted above and other problems are addressed by Applicants' invention as summarized below.

SUMMARY OF INVENTION

According to one aspect of the present invention, a method for controlling fuel injection during engine startup in a hybrid electric vehicle is provided. The hybrid electric vehicle includes an engine, a power source, an electrical machine, and a control module for monitoring and controlling the hybrid electric vehicle. The engine is adapted to drive a vehicle wheel and includes a plurality of cylinders and a fuel injector associated with each cylinder. The electrical machine is adapted to be powered by the power source to drive the engine or the vehicle wheel.

The method includes the steps of driving the engine with the electrical machine, determining whether the engine is at a target state, selecting a cylinder for fuel injection, calculating an amount of fuel to provide to the cylinder, injecting the amount of fuel with the fuel injector, and repeating the selecting, calculating, and injecting steps for another cylinder for a predetermined number of iterations to facilitate robust engine starting and reduce vehicle emissions.

The engine may include an air intake manifold adapted to provide air to the plurality of cylinders. The step of determining whether the engine is at the target state may include determining whether a pressure sensed in the air intake manifold pressure is less than a first limit value, determining whether a number of cylinder events exceeds a second limit value, or determining whether a predetermined amount of time has elapsed.

The step of calculating the amount of fuel to provide to the cylinder may include obtaining a first fuel/air ratio value, calculating a second fuel/air ratio value based on an engine coolant temperature and a counted number of cylinder events, adding the first and second fuel/air ratio values to produce a target fuel/air ratio value, and determining the amount of fuel to provide based on the target fuel/air ratio value.

The time required to calculate the first fuel/air ratio value may be greater than the time required to calculate the second fuel/air ratio value. The second fuel/air ratio value calculated during a current iteration may be less than the second fuel/air ratio value calculated during a preceding iteration. The amount of fuel provided to each cylinder may be constant for a subset of the predetermined number of iterations.

According to another aspect of the present invention, a method for controlling fuel injection during engine startup in a hybrid electric vehicle is provided. The hybrid electric vehicle includes an engine, a power source, an electrical machine, and a control module for monitoring and controlling the hybrid electric vehicle. The engine is adapted to drive a vehicle wheel and includes a plurality of cylinders. The electrical machine is adapted to be powered by the power source to selectively drive the engine or the vehicle wheel.

The method includes the steps of driving the engine with the electrical machine, determining whether the engine is at a target speed, selecting a cylinder for fuel injection, calculating a first fuel/air ratio value and a second fuel/air ratio value, providing a target fuel/air ratio to the cylinder based on the first and second fuel/air ratio values, incrementing a counter, and repeating the selecting, calculating, providing, and incrementing steps with the control module until the counter exceeds a predetermined value.

The first fuel/air ratio value may be greater than the second fuel/air ratio value. The target fuel/air ratio may decrease each iteration to reduce vehicle emissions.

According to another aspect of the present invention, a method for controlling fuel injection during engine startup in a hybrid electric vehicle is provided. The hybrid electric vehicle includes an engine, a power source, an electrical machine, a control module, and first, second, third, and fourth signals. The engine is adapted to drive a vehicle wheel includes a plurality of cylinders, a fuel injector associated with each cylinder, an air intake manifold, a camshaft, a crankshaft, and an engine cooling system. The electrical machine is adapted to be powered by the power source to drive the engine or the vehicle wheel. The first signal is indicative of an air intake manifold pressure. The second signal is indicative of a camshaft position. The third signal is indicative of a crankshaft position. The fourth signal is indicative of an engine coolant temperature.

The method includes the steps of driving the engine with the electrical machine, determining whether the engine is at a target state, selecting a cylinder for fuel injection, calculating a target fuel/air ratio value, incrementing a counter value, providing an amount of fuel to each of the plurality of cylinders in a predetermined sequence based on the target fuel/air ratio value, and repeating the calculating, incrementing, and providing steps for a predetermined number of iterations.

The engine may be at the target state when the first signal is less than a first limit value. The step of selecting a cylinder may be based on the second and third signals. The step of calculating the target fuel/air ratio value may include obtaining a first fuel/air ratio value, calculating a second fuel/air ratio value based on the fourth signal and the counter value, and adding the first and second fuel/air ratio values.

DETAILED DESCRIPTION

Figure 1:
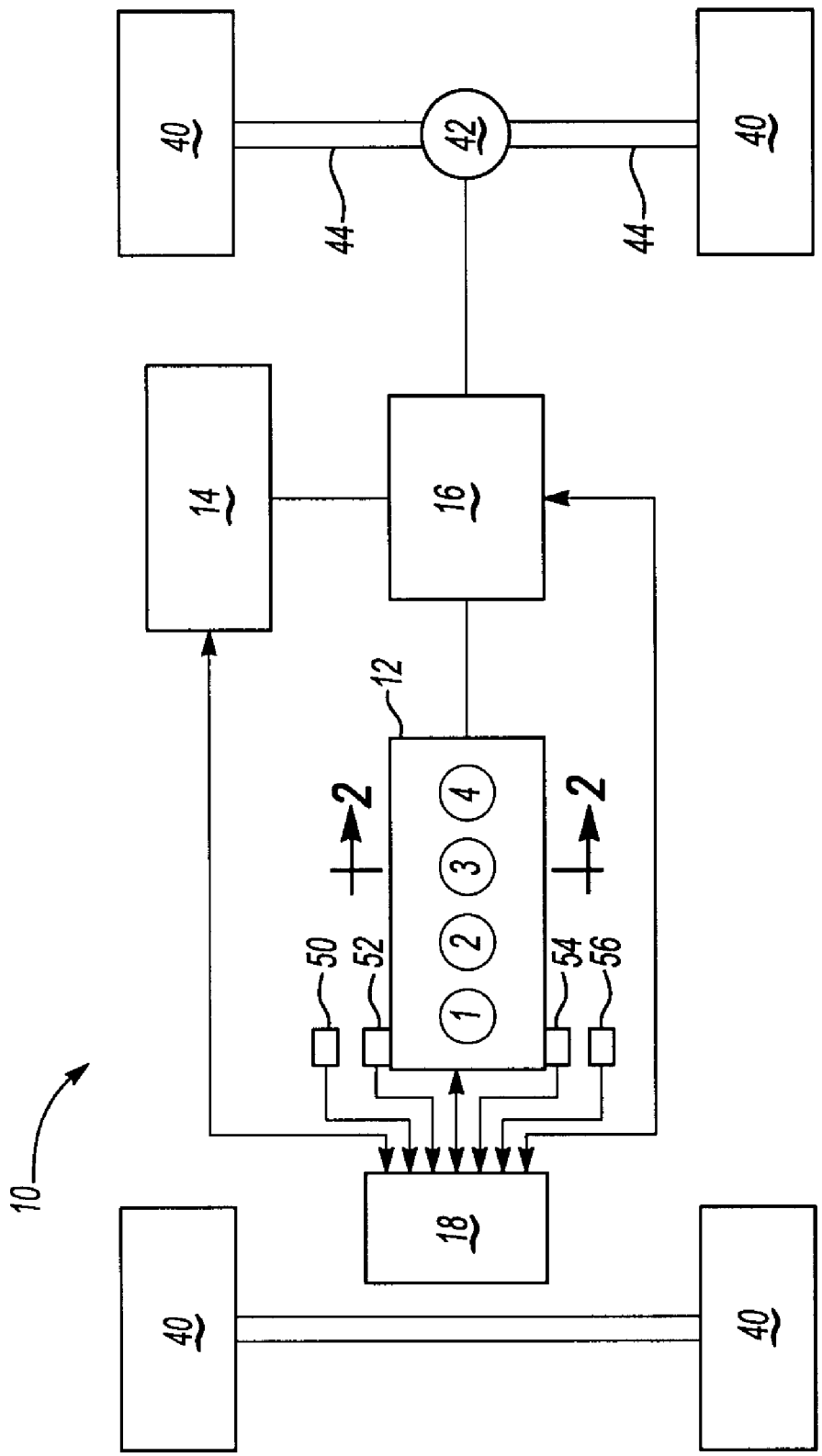
FIG. 1 is a schematic of a hybrid electric vehicle having an engine.

Referring to FIG. 1, a schematic of a hybrid electric vehicle 10 is shown. The hybrid electric vehicle 10 includes an engine 12, a power source 14, an electrical machine 16, and at least one control module 18. The hybrid electric vehicle 10 may have any suitable drive train configuration, such as a series hybrid drive, parallel hybrid drive, or split hybrid drive as is known by those skilled in the art.

Figure 2:
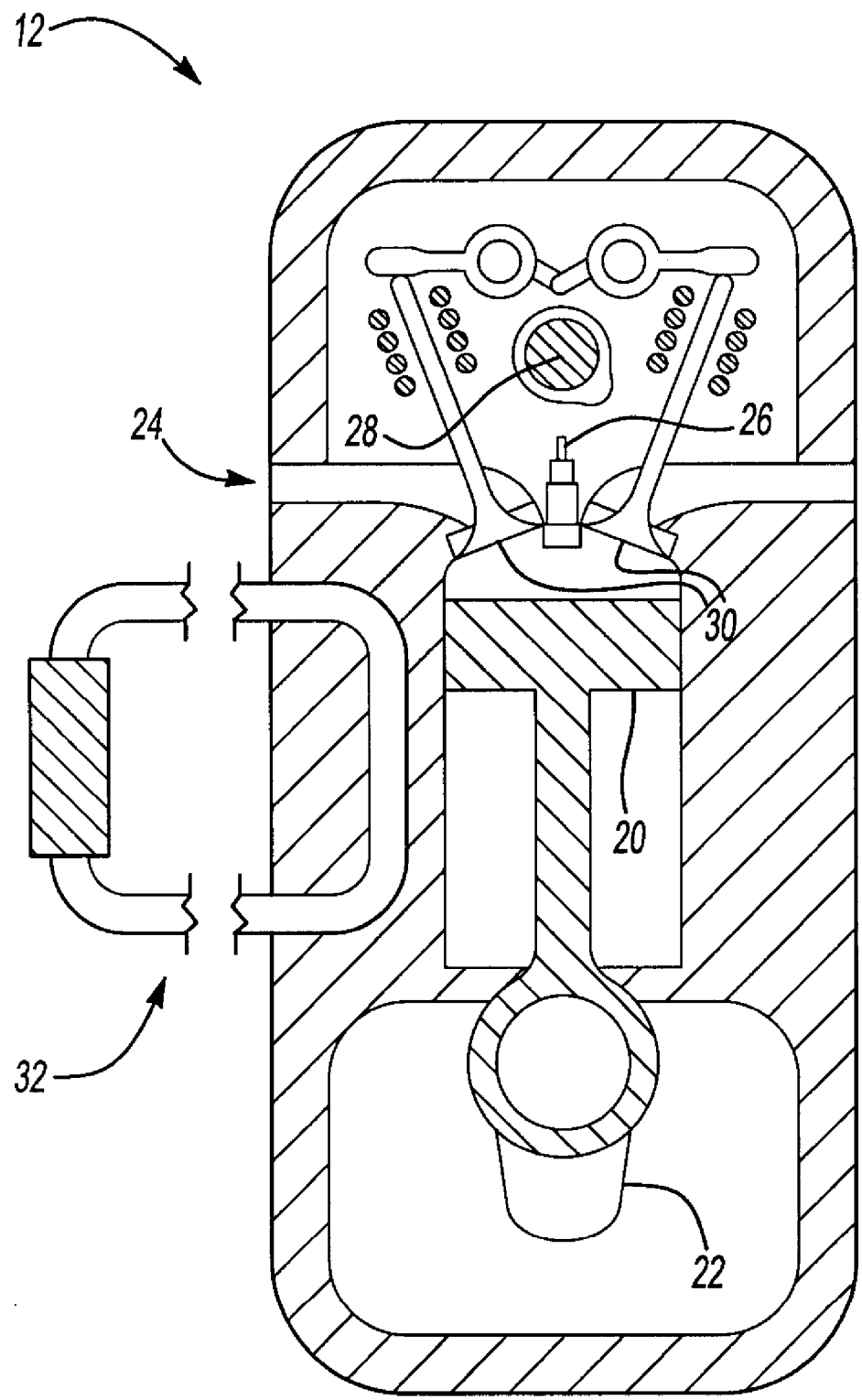
FIG. 2 is a section view of the engine along section 2—2.

The engine 12 may have any suitable configuration. In the embodiment shown in FIG. 1, the engine 12 is configured as an in-line four cylinder, four stroke cycle internal combustion gasoline engine. Referring to FIGS. 1 and 2, the engine 12 includes a cylinder block having a plurality of cylinders, numbered 1 through 4, in which pistons 20 can slide. The pistons 20 are connected to an engine crankshaft 22. In addition, the engine 12 also includes an air intake manifold 24, a fuel injector 26 associated with each cylinder, a camshaft 28, a plurality of valves 30, and a cooling system 32.

The air intake manifold 24 and fuel injectors 26 are adapted to provide pressurized air and fuel, respectively, to each cylinder to facilitate combustion. The fuel injectors 26 are part of a fuel delivery system that may be configured to deliver fuel via direct or indirect injection as known by those skilled in the art. The fuel injectors 26 are controlled by the control module 18, which provides an injector control signal to each fuel injector 26. More specifically, each fuel injector 26 opens for a time determined by a pulse width of its respective injector control signal.

The camshaft 28 is configured to rotate to actuate the valves 30 associated with each cylinder in a manner known by those skilled in the art.

The cooling system 32 is adapted to circulate a fluid, such as coolant, through passages in the cylinder block to transfer heat from the engine 12 to the surrounding environment.

The power source 14 may be of any suitable type. For example, an electrical power source 14 such as a battery, a battery pack having a plurality of electrically interconnected cells, a capacitor, or a fuel cell may be employed. Alternatively, a non-electrical power source, such as a hydraulic power source could be employed. For simplicity, the description below will primarily refer to an embodiment of the present invention that incorporates an electrical power source.

The electrical machine 16 may be of any suitable type, such as a motor, motor-generator, or starter-alternator. In FIG. 1, the electrical machine 16 is connected to the engine 12 and the power source 14. More specifically, the electrical machine 16 may be powered by the power source 14 and may be adapted to drive the engine 12 or one or more vehicle traction wheels 40. In addition, power may flow through the electrical machine 16 in the opposite direction to charge the power source or drive the engine 12. In the embodiment shown in FIG. 1, the electrical machine 16 is connected to a differential 42 that is connected to a pair of axles 44 that are each connected to a vehicle traction wheel 40.

The control module 18 is used to monitor and control various aspects of the hybrid electric vehicle 10. For example, the control module 18 may be connected to the engine 12, power source 14, and electrical machine 16 to monitor and control their operation and performance. In addition, the control module 18 also processes inputs from various sensors to determine the proportions of fuel and air, or "fuel/air ratio" for proper combustion. These sensors may include an air intake manifold pressure sensor 50, a coolant temperature sensor 52, a crankshaft position sensor 54, and/or a camshaft position sensor 56.

The air intake manifold pressure sensor 50 may be of any suitable type and may be disposed in any suitable location, such as in the air intake manifold 22.

The coolant temperature sensor 52 may of any suitable type and may be located in any suitable location. For example, the coolant temperature sensor 52 may be a thermocouple or thermistor disposed proximate the cooling system 32.

The crankshaft and camshaft position sensors 54,56 may be disposed proximate the crankshaft 22 and camshaft 28, respectively, to detect rotational movement. The crankshaft and camshaft position sensors 54,56 may be of any suitable type, such as encoders that utilize optical or magnetic detection means.

Figure 3:
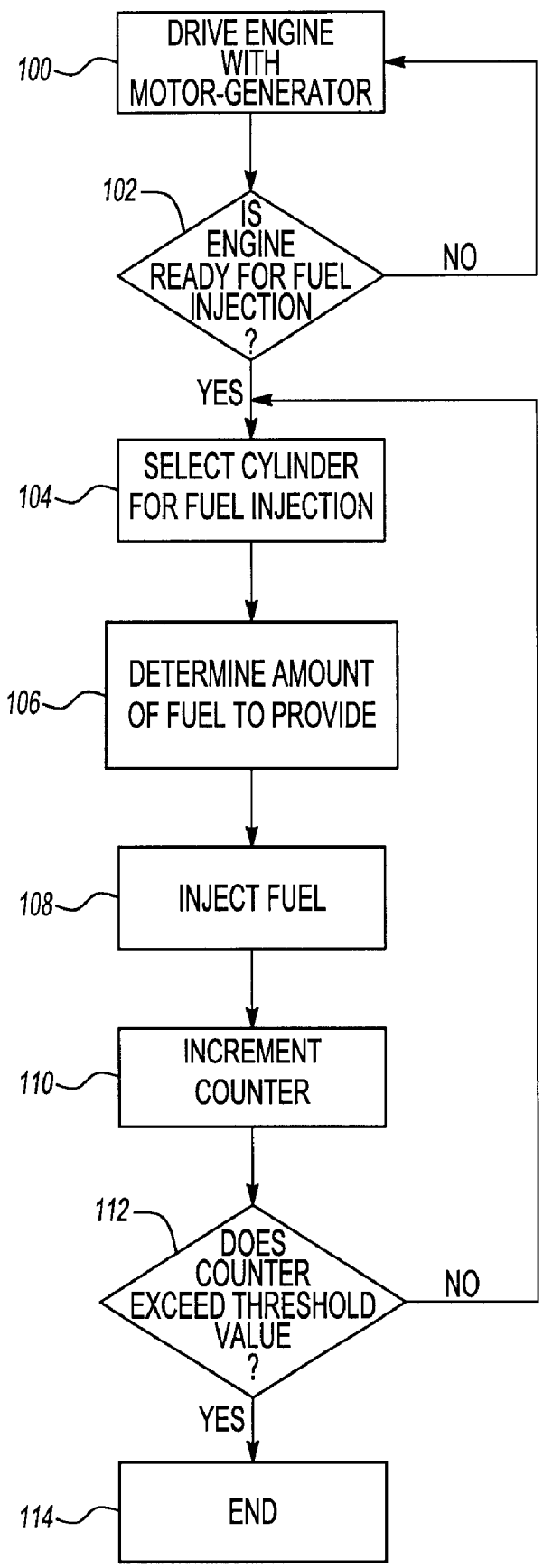
FIG. 3 is a flowchart of a method for controlling fuel injection during startup of the engine.
Figure 4:
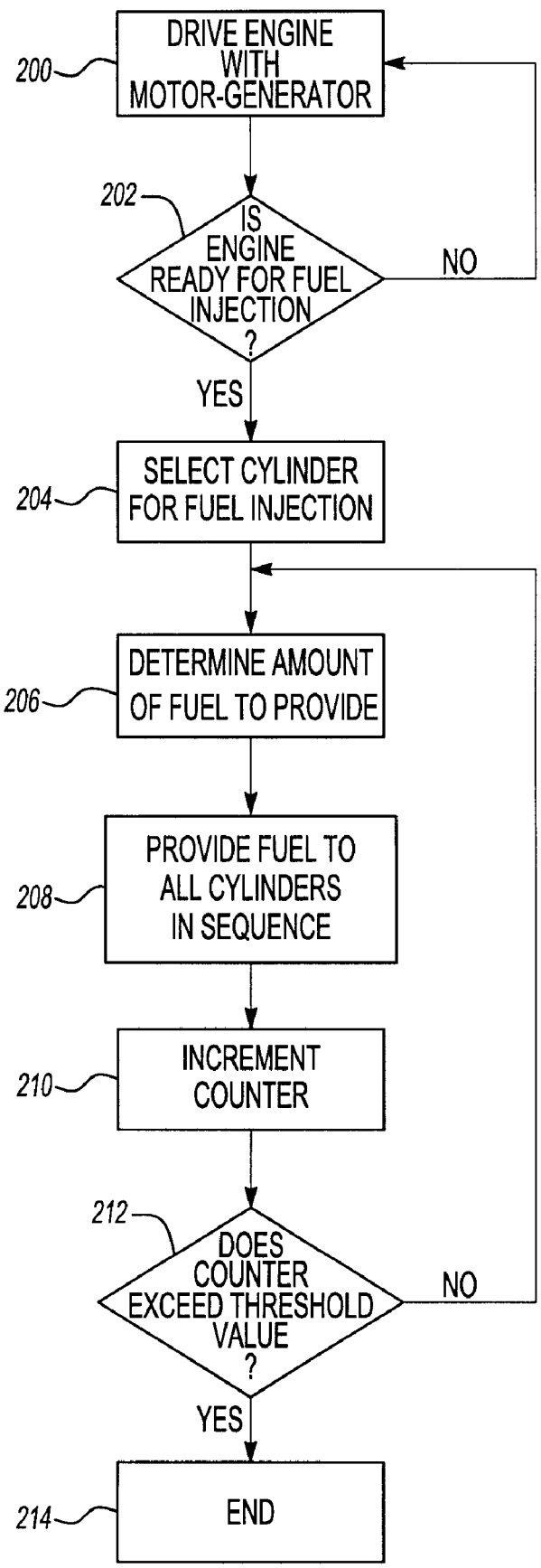
FIG. 4 is a flowchart of another embodiment of the method for controlling fuel injection during startup of the engine.

Referring to FIGS. 3 and 4, two embodiments of a method for controlling fuel injection during engine startup are shown. For convenience, the embodiments are described with reference to the hybrid vehicle shown in FIGS. 1 and 2.

As will be appreciated by one of ordinary skill in the art, the flowchart represents control logic which may be implemented using hardware, software, or combination of hardware and software. For example, the various functions may be performed using a programmed microprocessor.

The control logic may be implemented using any of a number of known programming or processing techniques or strategies and is not limited to the order or sequence illustrated. For instance, interrupt or event-driven processing is typically employed in real-time control applications, such as control of an engine or vehicle subsystem, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

The flowcharts in FIGS. 3 and 4 focus on the steps for assessing and providing a desired amount of fuel to one or more engine cylinders to promote robust engine starting while inhibiting unwanted vehicle emissions. More specifically, it is desirable to accelerate the engine to a desired speed before injecting fuel so as to achieve robust combustion, but not provide too much fuel since the excess fuel will not be fully combusted. As such, these methodologies may be implemented when the engine is not running and other control logic has determined that it is desirable to start the engine.

At 100 in FIG. 3, the flowchart begins the engine startup sequence by driving the engine 12 with the electrical machine 16. More specifically, the power source 14 powers the electrical machine 16 and the electrical machine 16 drives or turns the engine 12.

At 102, the method determines whether the engine 12 is ready for the injection of fuel into one or more cylinders. More specifically, the method determines whether the engine 12 is at a target state, such as a desired engine speed. This determination may be based on an air intake manifold pressure, a timer, a counter, or combinations thereof as described below.

Air intake manifold pressure decreases as engine speed increases. If the air intake manifold pressure exceeds the threshold value, the engine speed is insufficient and the process returns to block 100. If the air intake manifold pressure is less than the threshold value, the process continues at block 104. The air intake manifold pressure signal may be provided by the air intake manifold pressure sensor 50. The threshold value is a function of various vehicle and engine characteristics and may be established by vehicle testing.

Alternately, a timer may be started when the electrical machine 16 begins to turn the engine 12. The engine 12 is considered to be at the target manifold pressure after a predetermined period of time has elapsed. The predetermined period of time may be established by vehicle testing.

Similarly, a counter may be incremented when the electrical machine 16 begins to turn the engine 12. For example, the counter may be incremented in response to a cylinder event, such as the movement of the piston or number of engine revolutions. An engine revolution may be detected using the crankshaft and/or camshaft position sensors 54,56. The engine 12 is considered to be at the target manifold pressure when the counter exceeds a predetermined value, which may be established by vehicle testing.

At 104, a cylinder is selected for fuel injection. More specifically, the method determines the next cylinder that will experience a complete intake stroke. The control module 18 may make this selection using signals from the crankshaft and/or camshaft position sensors 54,56 in conjunction with the firing sequence of the engine 12.

Next, at 106, the method determines the appropriate amount of fuel to provide to the selected cylinder. Determining the appropriate amount of fuel is a three-step process. First, a base fuel/air ratio value is obtained or calculated. Second, an adjustment fuel/air ratio value is calculated. Third, the base fuel/air ratio value and adjustment fuel/air ratio value are added together to produce a target fuel/air ratio value.

The base fuel/air ratio value is typically calculated by a computer-controlled electronic fuel injection system using a complex, computationally intensive algorithm that is based on many input signals, such as throttle position, engine speed, intake air temperature, intake manifold vacuum level, barometric pressure, exhaust gas oxygen level, and/or vehicle speed as is known by those skilled in the art. The base fuel/air ratio value may not reflect the current vehicle operating conditions due to the delay inherent in processing the input signals and completing computations. Consequently, the base fuel/air ratio value may not precisely control engine fueling during startup to reduce vehicle emissions.

The adjustment fuel/air ratio value is used to remedy the deficiencies of the base fuel/air ratio value. The adjustment fuel/air ratio value may be based on coolant temperature and a counter value indicative of the number of cylinder events detected. The coolant temperature may be provided by the coolant temperature sensor 52. The number of cylinder events may be based on signals from the crankshaft and/or camshaft position sensors 54,56 as previously discussed. The coolant temperature and counter signals may be used to reference adjustment values stored in a look-up table. Moreover, since the adjustment fuel/air ratio value is based on fewer variables than the base fuel/air ratio value, it may be updated faster than the base fuel/air ratio value to more precisely determine fuel requirements.

At 108, the appropriate amount of fuel is provided to the selected cylinder. More specifically, the control module 18 provides an injector control signal with a desired pulse width corresponding to the target fuel/air ratio value to cause the fuel injector 26 to open and close as previously described.

At 110, a counter is incremented to indicate that fuel injection to the selected cylinder is complete. This step may be positioned in any suitable sequence in the control logic.

At 112, the counter value is compared to a threshold value. If the counter value is greater than the threshold value, the engine 12 is considered to be operating under its own power. Consequently, the additional fuel provided during the engine startup sequence is no longer required and the flowchart ends at block 114. If the counter value does not exceed the threshold value, the method returns to block 104 to select the next cylinder for fuel injection and repeat the subsequent steps. The threshold value may be established by vehicle testing.

Referring to FIG. 4, a second embodiment of the method is shown. This embodiment is similar to that shown in FIG. 3. However, in this embodiment, once a cylinder is selected, the constant amount of fuel is provided to each cylinder for one iteration of the engine firing sequence.

The method begins with steps 200, 202, and 204, 206 which correspond to steps 100, 102, 104, and 106, respectively.

At 208, the amount of fuel determined in step 206 is provided to each cylinder in the firing sequence. For example, in the four cylinder engine shown in FIG. 1, the same amount of fuel is sequentially provided to each of the four cylinders during an iteration of the method. The amount of fuel may change for each iteration.

Steps 210 and 212 correspond to steps 110 and 112, respectively. However, at step 212 if the counter does not exceed a threshold value, the method returns to block 206 and does not reselect a cylinder for fuel injection. The selection step does not need to be repeated since once a cylinder is selected, the order of all subsequent fuel injections is known due to the repetitive firing sequence.

Figure 5:
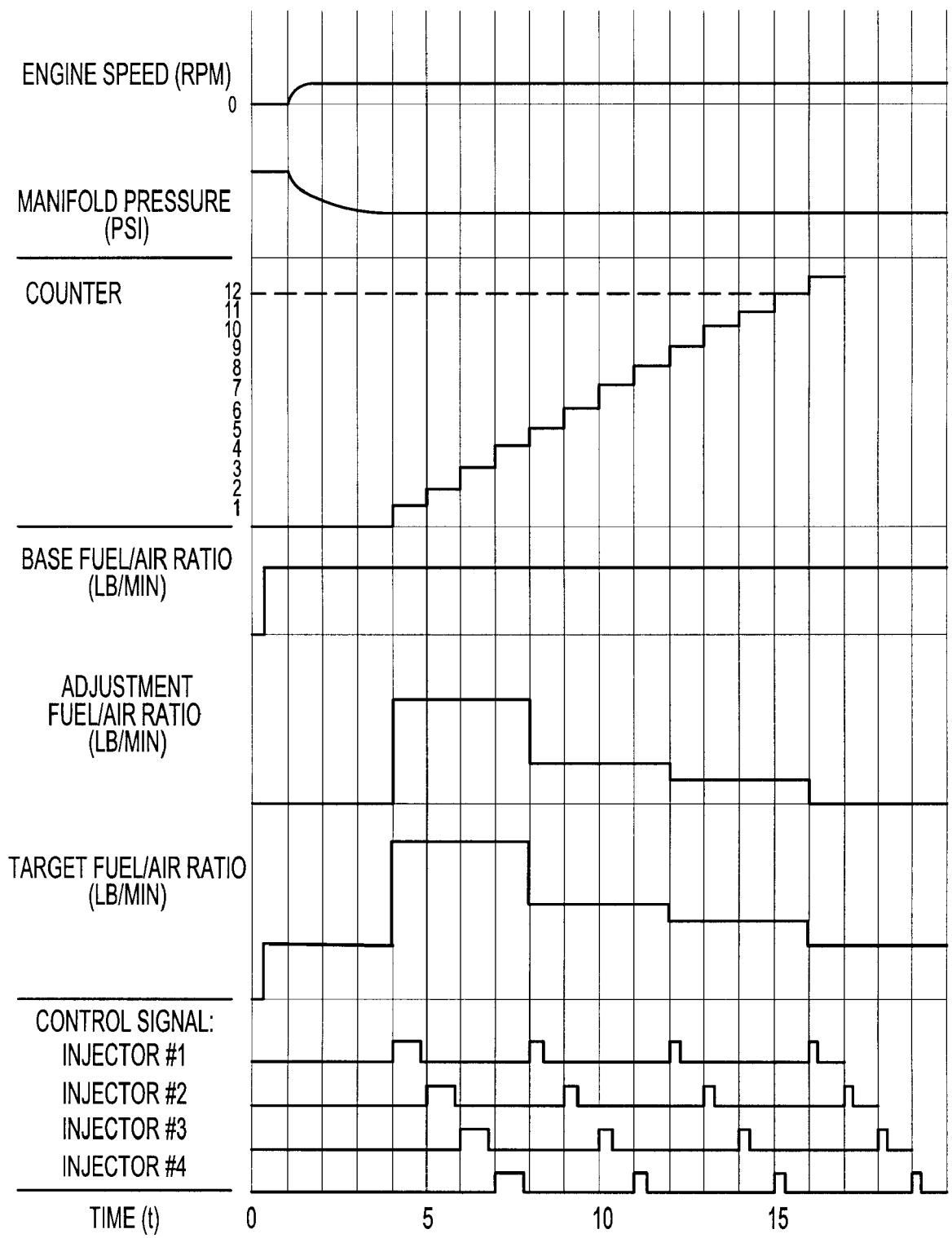
FIG. 5 is a plot depicting the operation of the engine during startup in accordance with the method shown in FIG. 3.

Referring to FIG. 5, a plot depicting the operation of the method presented in FIG. 3 is shown. In the plot, the horizontal axis represents time (t). For convenience in reference, a plurality of spaced vertical lines that represent a series of time increments are shown. The leftmost vertical line is time 0 (t=0), the next vertical line is time 1 (t=1), and so on. Along the vertical axis various hybrid vehicle attributes including engine speed, air intake manifold pressure, counter value, base fuel/air ratio value, adjustment fuel/air ratio value, target fuel/air ratio value, and fuel injector control pulses are depicted.

At t=0, the engine 12 is not operating and the engine speed is zero. The air intake manifold pressure is at a high level since the engine 12 is not receiving air for combustion.

The counter and fuel/ratio values are initially set equal to zero. Similarly, fuel injector control signals are at a zero or a low voltage level, indicating that the fuel injectors are closed.

Between t=0 and t=1, the control module 18 receives a signal to start the engine 12. The control module 18 then calculates the base fuel/air ratio value. For simplicity, the base fuel/air ratio value is a constant in this example. However, the base fuel/air ratio value may change over time.

At t=1, driving of the engine 12 with the electrical machine 16 is commenced.

Between t=1 and t=4, the engine speed increases as the electrical machine 16 accelerates the engine 12. As the engine 12 accelerates, the air intake manifold pressure decreases since air is permitted to flow into the engine 12.

At t=4, the engine speed is at a sufficient for fuel injection. The adjustment fuel/air ratio value is calculated and added to the base fuel/air ratio value to obtain the target fuel/air ratio value. In addition, the next cylinder available for fuel injection is selected. In this example, cylinder 1 is selected and the hypothetical engine firing sequence is 1–2–3–4.

After the target fuel/air ratio has been calculated, an injection control pulse is sent to the fuel injector for cylinder 1. The pulse causes the fuel injector to open and dispense fuel. The counter is incremented and compared with a threshold value. In this example, the threshold value is 12. Since the counter value is less than 12, the method steps are repeated. More specifically at t=5, 9 and 13, the fuel injector for cylinder 2 receives an injector control pulse, at t=6, 10, and 14 the fuel injector for cylinder 3 receives an injector control pulse, and at t=7, 11, and 15 the fuel injector for cylinder 4 receives an injector control pulse. In addition, the counter value is incremented after each pulse. Moreover, in this example, the adjustment fuel/air ratio value decreases after a firing sequence is completed at t=8, 12, and 16.

At t=16, the counter value equals 13, which exceeds the threshold value of 12. Consequently, the methodology terminates and subsequent fuel injection pulses are based solely on the base fuel/air ratio value.

This methodology provides the additional fuel desired for good combustion at engine startup, yet intelligently provides that fuel to an appropriate cylinder to improve combustion and lower emissions. In addition, this method facilitates rapid fueling adjustments in response to changing environmental conditions and vehicle performance attributes. Moreover, this method allows computationally intensive calculations, such as base fuel/air ratio calculations to be separately conducted from the fuel adjustments made for a cylinder event.

While the best mode for carrying out the invention has been described in detail, those familiar with the art to which this invention relates will recognize various alternative designs and embodiments for practicing the invention as defined by the following claims.

The invention claimed is:

1. A method for controlling fuel injection during engine startup in a hybrid electric vehicle, the hybrid electric vehicle having an engine adapted to drive a vehicle wheel and including a plurality of cylinders and a fuel injector associated with each cylinder, a power source, an electrical machine adapted to be powered by the power source to drive the engine or the vehicle wheel, and a control module for monitoring and controlling the hybrid electric vehicle, the method comprising the steps of:

driving the engine with the electrical machine;
determining whether the engine is at a target state;
selecting a cylinder for fuel injection;
calculating an amount of fuel to provide to the cylinder based on first and second fuel/air ratio values;
injecting the amount of fuel with the fuel injector; and
repeating the selecting, calculating, and injecting steps for another cylinder for a predetermined number of iterations.

2. The method of claim 1 wherein the engine further comprises an air intake manifold adapted to provide air to the plurality of cylinders and the step of determining whether the engine is at the target state comprises determining whether a pressure sensed in the air intake manifold is less than a first limit value.

3. The method of claim 2 wherein the step of determining whether the engine is at the target state comprises determining whether a number of cylinder events exceeds a second limit value.

4. The method of claim 1 wherein the step of determining whether the engine is at the target state comprises determining whether a predetermined amount of time has elapsed.

5. The method of claim 1 wherein the step of calculating the amount of fuel to provide to the cylinder comprises obtaining a first fuel/air ratio value, calculating a second fuel/air ratio value based on an engine coolant temperature and a counted number of cylinder events, adding the first and second fuel/air ratio values to produce a target fuel/air ratio value, and determining the amount of fuel to provide based on the target fuel/air ratio value.

6. The method of claim 1 wherein the time required to calculate the first fuel/air ratio value is greater than the time required to calculate the second fuel/air ratio value.

7. The method of claim 1 wherein the second fuel/air ratio value calculated during a current iteration is less than the second fuel/air ratio value calculated during a preceding iteration.

8. The method of claim 1 wherein the amount of fuel provided to each of the plurality of cylinders is constant for a subset of the predetermined number of iterations.

9. A method for controlling fuel injection during engine startup in a hybrid electric vehicle, the hybrid electric vehicle having an engine adapted to drive a vehicle wheel and including a plurality of cylinders, a power source, an electrical machine adapted to be powered by the power source to selectively drive the engine or the vehicle wheel, and a control module for monitoring and controlling the hybrid electric vehicle, the method comprising the steps of:

driving the engine with the electrical machine;
determining whether the engine is at a target speed;
selecting a cylinder for fuel injection;
calculating a first fuel/air ratio value and a second fuel/air ratio value indicative of an additional amount of fuel to provide to the cylinder;
providing a target fuel/air ratio to the cylinder based on the first and second fuel/air ratio values;
incrementing a counter; and
repeating the selecting, calculating, providing, and incrementing steps with the control module until the counter exceeds a predetermined value.

10. The method of claim 9 wherein the engine further comprises an air intake manifold adapted to provide air to the plurality of cylinders and the step of determining whether the engine is at the target speed includes determining whether air pressure in the air intake manifold is less than a first limit value.

11. The method of claim 9 wherein the step of determining whether the engine is at the target speed comprises determining whether the counter exceeds a second limit value.

12. The method of claim 9 wherein the step of determining whether the engine is at the target speed comprises determining whether a predetermined amount of time has elapsed.

13. The method of claim 9 wherein the time required to calculate the first fuel/air ratio value is greater than the time required to calculate the second fuel/air ratio value.

14. The method of claim 9 wherein the first fuel/air ratio value is greater than the second fuel/air ratio value.

15. The method of claim 9 wherein the target fuel/air ratio decreases each iteration to reduce vehicle emissions.

16. A method for controlling fuel injection during engine startup in a hybrid electric vehicle, the hybrid electric vehicle having an engine adapted to drive a vehicle wheel and including a plurality of cylinders, a fuel injector associated with each cylinder, an air intake manifold, a camshaft, a crankshaft, and an engine cooling system, a power source, an electrical machine adapted to be powered by the power source to drive the engine or the vehicle wheel, a first signal indicative of an air intake manifold pressure, a second signal indicative of a camshaft position, a third signal indicative of a crankshaft position, a fourth signal indicative of an engine coolant temperature, and a control module for monitoring and controlling the hybrid electric vehicle, the method comprising the steps of:

driving the engine with the electrical machine;

determining whether the engine is at a target state;

selecting a cylinder for fuel injection;

calculating a target fuel/air ratio value based on first and second fuel/air ratio values;

incrementing a counter value;

providing an amount of fuel to each of the plurality of cylinders in a predetermined sequence based on the target fuel/air ratio value; and repeating the calculating, incrementing, and providing steps for a predetermined number of iterations.

17. The method of claim 16 wherein the engine is at the target state when the first signal is less than a first limit value.

18. The method of claim 16 wherein the step of selecting a cylinder is based on the second and third signals.

19. The method of claim 16 wherein the step of calculating the target fuel/air ratio value further comprises obtaining a first fuel/air ratio value, calculating a second fuel/air ratio value based on the fourth signal and the counter value, and adding the first and second fuel/air ratio values.

20. The method of claim 16 wherein the second fuel/air ratio value decreases each iteration to reduce vehicle emissions.

* * * * *